United States Patent [19]
Yamaguchi et al.

[11] Patent Number: 5,411,651
[45] Date of Patent: May 2, 1995

[54] METHOD FOR ELECTROSTATIC LIQUID/LIQUID CONTACTOR

[75] Inventors: Manabu Yamaguchi, Kobe; Masaaki Kanno, Nishiomiya, both of Japan

[73] Assignee: National Tank Company, Houston, Tex.

[21] Appl. No.: 24,737

[22] Filed: Mar. 1, 1993

[51] Int. Cl.$^6$ .......................... C02F 1/48; C10G 33/02
[52] U.S. Cl. .................... 204/186; 204/188; 204/302
[58] Field of Search .................. 204/186, 188–191, 204/302

[56] References Cited

U.S. PATENT DOCUMENTS

| | | | |
|---|---|---|---|
| 3,592,752 | 7/1971 | Pfeifer | 204/188 |
| 4,033,851 | 7/1977 | Oros | 204/302 |
| 4,161,439 | 7/1979 | Warren et al. | 204/306 |
| 4,349,430 | 9/1982 | Efimov et al. | 204/302 |
| 4,623,436 | 11/1986 | Umehara | 204/149 |
| 4,624,763 | 11/1986 | Chimenti | 204/188 |
| 4,624,764 | 11/1986 | Mintz et al. | 204/302 |
| 4,624,765 | 11/1986 | Cerkanowicz et al. | 204/188 |
| 4,636,290 | 1/1987 | Bethuel et al. | 204/186 |
| 4,941,959 | 7/1990 | Scott | 204/186 |
| 5,039,386 | 8/1991 | Margolis | 204/182 |

OTHER PUBLICATIONS

J. D. Thornton, The Application of Electrical Energy to Chemical and Physical Rate Processes, *Rev. Pure and Appl. Chem.*, 18(1968), pp. 197–218.

R. A. Mugele et al., Droplet Size Distribution in Sprays, *Industrial and Engineering Chemistry*, Jun. 1961, pp. 1317–1324.

L. Martin et al., Electrical Field Contactor for Solvent Extraction, *Separation Science and Technology*, 18(14&15), 1983, pp. 1455–1471.

P. J. Balles, Solvent Extraction in an Electrostatic Field, *Ind. Eng. Chem. Process Des. Dev.*, 1981, 20, pp. 564–570.

*Primary Examiner*—John Niebling
*Assistant Examiner*—William T. Leader
*Attorney, Agent, or Firm*—Head & Johnson

[57] ABSTRACT

The present invention is a method utilizing a liquid-liquid contactor which employs an electrostatic field to mix an organic phase with an aqueous phase and to coalesce the aqueous phase in order to accomplish extraction of a component present in the aqueous phase. The electrostatic field is formed between a rod electrode located within a gaseous phase adjacent the top of the contactor and a plate electrode located within the aqueous phase adjacent the bottom of the contactor by applying a high voltage to the rod electrode. The extraction process consists of an extraction stage where the component is extracted out of the aqueous phase by the organic phase and a subsequent stripping stage where the component is stripped out of the organic phase by ion exchange with a second aqueous phase.

4 Claims, 7 Drawing Sheets

METHOD FOR ELECTROSTATIC LIQUID/LIQUID CONTACTOR

BACKGROUND OF THE INVENTION

1. Field of the Invention

The present invention relates to a method and apparatus for conducting liquid-liquid extraction. More specifically, the present invention utilizes a liquid-liquid contactor provided with electrodes that are capable of being electrically energized to establish an electrostatic field within the contactor. The electrostatic field functions to mix an aqueous phase with an organic phase and to separate the two phases without any other means of liquid dispersers, mixers or settlers.

2. Description of the Related Art

In separation processes dealing with liquid drops, various attempts have been made to enhance the mass transfer efficiencies of the drops. Generally, transfer efficiency is enhanced by producing a larger interfacial area and a higher degree of turbulence within and around drops to increase eddy diffusion. The requirement for creating local turbulence coupled with a large interfacial area is difficult because these features are incompatible in the sense that small drops do not have high relative velocities nor do they exhibit marked internal circulation patterns. The present invention utilizes an electric field as a technique to overcome these problems. This technique has the advantage of easily producing small charged drops by use of electrostatic force, and the charged drops can move through an extracted organic phase with higher velocity due to the Coulomb force, which movement induces a high degree of fluid turbulence around and within the drops. This technique can be applied to mass transfer operations, such as metal extraction, to produce high interfacial areas coupled with enhanced mass transfer co-efficients.

Furthermore, direct utilization of electrical energy in processes involving liquid drops will give higher energy efficiency than energy supplied in the form of thermal or mechanical energy. Also, by eliminating the need for mechanical mixing apparatus, capital and maintenance costs can also be reduced.

Many electrostatic liquid-liquid contactors have been proposed. For example, U.S. Pat. No. 4,161,439 to Warren et al teaches a contactor for solvent extraction for use in the mining industry. Warren teaches use of settling tanks to separate the organic and aqueous phases which are mixed in the Warren contactor. Output of this type of process has been limited by the size of the settling tanks and residency time required in the settling tanks to obtain satisfactory separation.

The present invention obtains improved settling rates by using the electric field to separate the aqueous and organic phases. The use of this invention is particularly applicable to solvent extraction, extractive fermentation, and desalting of crude oil.

Recovering and purifying biochemical products from complex fermentation broth mixtures is one branch of selective solvent extraction for which the present invention is useful. Such biochemical products include new pharmaceuticals, secondary metabolic antibiotics, polymer intermediates, thickeners and modifiers, and enzymes, etc. The present invention offers the fundamental advantage of high selectivity and operation at ambient temperatures which is an important consideration for the recovery of heat sensitive molecules.

Any separation process for use in recovering products from fermentation liquors faces not only the problem of product stability, but also the physical properties of the broth itself, specifically, the problem of removing dead micro-organisms, cell debris, and lysis material prior to separation. This solid/liquid separation can be a major economic constraint in terms of cost of separation equipment and lost recovery. High viscosity and non-Newtonian behavior of some fermentation broths are a further difficulty encountered particularly when using conventional liquid-liquid extraction methods. Also, the solid materials can form stable emulsions or collect at the interface and significantly reduce mass transfer efficiencies.

In the area of extractive fermentations, there has been a strong interest recently in developing solvent extraction technology for recovery and purification of fuel alcohol arising from fermentation processes. The energy intensive nature of distillation processes and the cost involved can represent a substantial portion of the value of the alcohol product. Also, another common property of many biological product systems is that maximum yield of product is subject to a phenomena of product inhibition whereby the activity of the micro-organisms involved in the fermentation is suppressed by the increasing concentration of the fermentation product. At higher concentrations of the fermentation product, the micro-organism activity is suppressed to unacceptably low levels, thus, placing a limit upon the final product concentrations achievable in a batch process. The present invention can be used as an in-line technique for removing fermentation products from batch fermentation processes, allowing significant improvements in the maximum achievable yield and conversion and, thereby, ameliorating the effects of product inhibition. Also, as a side benefit, the voltage applied to the microorganisms can by electrical stimulus increase their activity.

SUMMARY OF THE INVENTION

The present invention is an electrostatic liquid-liquid contactor for accomplishing metal extraction between an aqueous phase and an organic phase. The present invention also includes a method by which one or more liquid-liquid contactors can be employed in a first extraction stage to extract metal from the aqueous phase into the organic phase and a subsequent stripping stage to strip the metal out of the organic phase by employing a regenerating aqueous phase.

The contactor used is a tank with an inner chamber having at least one rod electrode located adjacent the top of the tank and a plate electrode located adjacent the bottom of the tank. A high voltage generator is attached to the rod electrode, and the plate electrode is grounded through an ammeter.

During the extraction stage, aqueous phase containing metal is introduced into the bottom of the tank so that it covers the plate electrode, organic phase containing an extractant is introduced into the tank above the aqueous phase, and a gaseous phase, preferably nitrogen, is introduced into the top of the tank above the organic phase so that it surrounds the rod electrode. The rod electrode is then energized, establishing an electrostatic field within the contactor. The electrostatic field causes the liquid-liquid interface between the organic and aqueous phases to be disrupted, forming aqueous drops which disperse in the organic phase due to the turbulence. When the rod electrode is energized positively, the drops are negatively charged and move upward in the electrostatic field until they contact a gas/liquid interface located between the gaseous and organic phases. Upon contact, the drops reverse polarity to a positive charge. The positively charged drops are repelled downward by the electrostatic field and are also pulled downward by gravity toward the aqueous phase. While, when the rod electrode is energized negatively instead of positively, the drops are oppositely charged to that described above and their moving behavior is the same as mentioned above. Meanwhile, the extractant in the organic phase is extracting the metal from the drops as they rise and descend within the organic phase. Upon contact with the aqueous phase, the drops coalesce and re-enter the aqueous phase. This cycle of drop formation, extraction and coalescence continues until the metal has been sufficiently extracted into the organic phase.

After the extraction is completed, the organic phase containing metal of the extraction stage is removed and transferred to an identical second liquid-liquid contactor as the organic phase for the stripping stage. The stripping stage employs a gaseous phase identical to the gaseous phase of the extraction stage and a regenerative aqueous phase consisting of an aqueous solution which has exchange ions available in the solution. Similar to the extraction stage, the rod electrode is energized forming an electrostatic field which creates aqueous drops and causes those drops to rise and fall through the organic phase as previously described for the extraction phase. However, in the stripping stage, the exchange ions contained within the aqueous drops are exchanged with the metal in the organic phase so that the metal is re-extracted into the aqueous phase, while the exchange ions regenerate the organic phase for reuse in the extraction stage.

DETAILED DESCRIPTION OF THE PREFERRED EMBODIMENTS

The Apparatus

Figure 1:
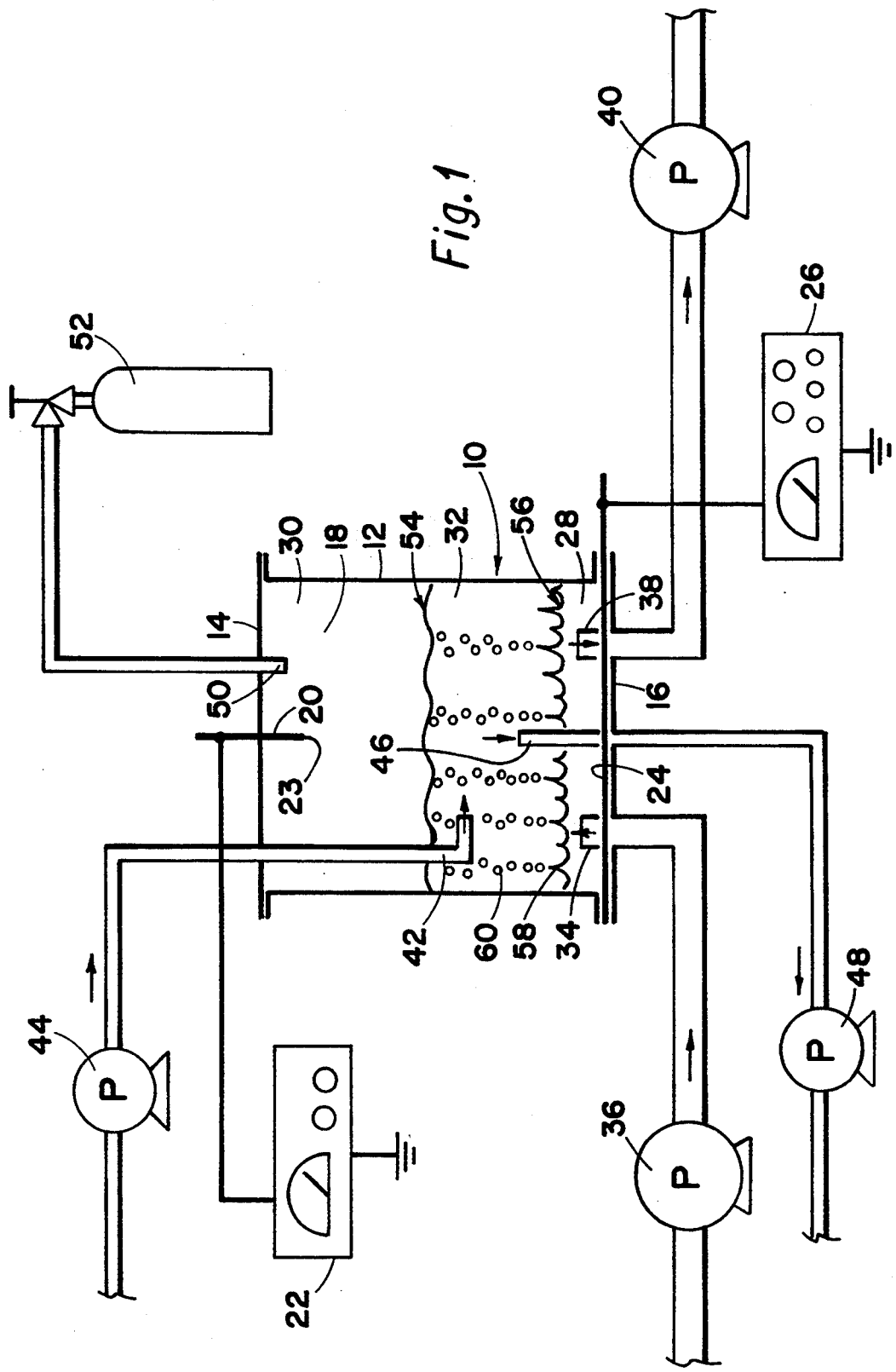
FIG. 1 is a schematic diagram of a liquid-liquid contactor constructed according to a preferred embodiment of the present invention.

Referring now to FIG. 1, there is a diagram of a liquid-liquid contactor 10 constructed according to a preferred embodiment of the present invention. The contactor 10 is provided with a tank 12, preferably cylindrical in dimension, having a top 14 and a bottom 16, and an interior chamber 18 lying between the top 14 and the bottom 16. At least one rod electrode 20 inserts through the top 14 and extends into the chamber 18 so that the rod electrode 20 is held vertically adjacent the top 14. The rod electrode 20 is connected to a high voltage generator 22 capable of supplying high voltage electrical energy to the rod electrode 20. The rod electrode 20 is a good conductor because it is made of copper, carbon or other suitably conducting material. Although, as illustrated in FIG. 1, the rod electrode 20 which extends downward into the chamber 18 may terminate at an end which is flat, the rod electrode 20 may have an end 23 made in one of various shapes and the end 23 is preferably either somewhat pointed, as for example, a pencil shaped end, or is rounded, as for example, a semi-spherically shaped end.

The chamber 18 is also provided with a plate electrode 24, preferably circular in dimension, which is located adjacent the bottom 16 of the tank 12. The plate electrode 24 is electrically grounded through an ammeter 26. The ammeter 26 is capable of measuring the electric current flowing between the rod electrode 20 and the plate electrode 24. The plate electrode 24 is preferably constructed of stainless steel since it must withstand contact with strongly acidic aqueous solutions.

The chamber 18 contains three phases: an aqueous phase 28 at the bottom 16; a gaseous phase 30 at the top 14; and an organic phase 32 located between the aqueous and gaseous phases 28 and 30. Because of the differences in density of the two-liquid phases, 28 and 32, the phases 28 and 32 initially remain distinct and do not intermingle where they interface.

The aqueous phase 28 consists of a metal containing aqueous solution from which metal is to be selectively extracted. The term "metal" is used hereafter to refer to both the ionic and non-ionic forms of the metals. Metals for which this extraction process can be employed include, but are not limited to, sodium, zinc, copper, nickel, cobalt, uranium, and the rare earth elements. The metal containing aqueous solution is introduced into the aqueous phase 28 of the chamber 18 by means of an aqueous phase inlet 34 provided in the bottom 16 and which extends upward into the aqueous phase 28. An aqueous phase inlet pump 36 is connected upstream of the aqueous phase inlet 34 and serves to introduce additional metal containing aqueous solution into the aqueous phase 28 of the chamber 18.

Once the metal has been extracted from the aqueous phase 28, as will be hereafter described in more detail, the extracted aqueous solution is removed from the chamber 18 by means of an aqueous phase outlet 38. The aqueous phase outlet 38 is located in the aqueous phase 28, extends through the bottom 16, and connects to an aqueous phase outlet pump 40 which serves to remove the extracted aqueous solution from the aqueous phase 28 of the chamber 18.

The organic phase 32 consists of a mixture comprised of at least one organic solvent and at least one extractant. The organic solvent may be an isoparaffinic hydrocarbon having a boiling range of 205°-257° C. commercially available as EXXON'S ISOPAR M, SOLVESSO 150, ISOPAR E, or any other organic solvent suitable for use with the metal sought to be extracted from the aqueous phase 28. The extractant may be di-2-ethylhexyl phosphoric acid (also referred to as D2EHPA), or any other extractant suitable for use with the organic solvent and suitable for reversible extraction of the metal sought to be extracted from the aqueous phase 28. Selection of the organic solvent and the extractant is especially important to enhance extraction rate and phase separation. It is important that the extractant be capable of reversible extraction, i.e., capable of chemically binding with the metal in order to extract the metal from the metal containing aqueous solution during an extraction stage of the process and capable of releasing the metal in exchange for replacement ions in a stripping stage of the process.

The organic solvent/extractant mixture is introduced into the organic phase 32 of the chamber 18 by means of an organic phase inlet 42 extending through the top 14 and downward into the organic phase 32. An organic phase inlet pump 44 is connected upstream of the organic phase inlet 42 and serves to introduce additional organic solvent/extractant mixture into the organic phase 32 of the chamber 18.

Once the metal has been extracted into the organic phase 32, as will be hereinafter more fully described, the metal containing organic solvent/extractant mixture is removed from the chamber 18 by means of an organic phase outlet 46. The organic phase outlet 46 is located in the organic phase 32, extends through the bottom 16 and connects to an organic phase outlet pump 48 which serves to remove the metal containing organic solvent/extractant mixture from the organic phase 32 of the chamber 18.

As illustrated in FIG. 1, the organic phase inlet 42 may be bent to direct flow of the organic phase 32 co-current with flow of the aqueous phase 28. However, it should be noted that as to an upward and downward flow of drops 60, the organic phase 32 is flowing cross-current as will be hereafter more fully described. Although not illustrated, the aqueous phase inlet and outlet 34 and 38 and the organic phase outlet 46 may be bent similarly to that illustrated for the organic phase inlet 42. Alternately, to establish countercurrent flow of the organic phase 32 with the aqueous phase 28, the placement of the organic phase inlet and outlet 42 and 46 can be reversed from that illustrated in FIG. 1.

For continuous flow-through processing, flow through the aqueous phase inlet 34 and flow out of the aqueous phase 28 through the aqueous phase outlet 38 are coordinated in order that a constant level of aqueous phase 28 is maintained in the chamber 18. Likewise, when using flow-through processing, flow into the organic phase 32 through the organic phase inlet 42 and flow out of the organic phase 32 through the organic phase outlet 46 are coordinated so that a constant level of organic phase 32 is maintained in the chamber 18.

Although the invention has been described for flow-through processing, i.e., continuous flow of organic phase 32 and aqueous phase 28 through the chamber 18 while the rod electrode 20 is energized, the invention could easily be adapted for batch processing if desired.

The gaseous phase 30 consists of preferably nitrogen gas which is introduced into the gaseous phase 30 of the chamber 18 by means of a gaseous phase inlet 50 provided in the top 14 and extending downward into the gaseous phase 30. The gaseous phase inlet 50 connects to a gas cylinder 52 which supplies a small constant flow of nitrogen gas to the gaseous phase 30. The rod electrode 20 is located in the gaseous phase 30.

Although the contactor 10 has been described as having the gaseous phase inlet 50 and the organic phase inlet 42 enter the chamber 18 through the top 14 and as having the organic phase outlet 46 and the aqueous phase inlet and outlet 34 and 38 enter the chamber 18 through the bottom 16, it is not critical that entry into the chamber 18 be achieved at these locations on the tank 12.

The Process

The process consists of two stages, the extraction stage and the stripping stage. During the extraction stage the above-described liquid-liquid contactor 10 is employed to extract the metal out of the aqueous phase 28 by facilitating binding of the metal to the extractant in the organic phase 32. During the subsequent stripping stage, a second identical liquid-liquid contactor (not illustrated) is employed to remove the metal from the organic phase. This removal is accomplished via an exchange between an extracting aqueous solution and the metal containing organic phase 32 from the extraction stage. During the stripping stage, the extracting aqueous solution provides exchange ions which displace the metal ions on the extractant so the metal ions are reversibly extracted into the aqueous phase 28. This reverse extraction process regenerates the organic solvent/extractant mixture so that it can be reused in the extraction stage.

1. The Extraction Stage

The liquid-liquid contactor 10 is filled with metal containing aqueous phase 28, extractant containing organic phase 32 and the gaseous phase 30. This may be either a batch process or a flow-through process with regard to the aqueous and organic phases 28 and 32. Regardless of whether this is a batch process or flow-through process, a gas/liquid interface 54 is formed between the gaseous and organic phases 30 and 32 and a liquid/liquid interface 56 is formed between the organic and aqueous phases 32 and 28.

The rod electrode 20 is then energized by the high voltage generator 22, thus, creating an electrostatic field within the chamber 18 between electrode 20 and the grounded plate electrode 24. Energy supplied to the rod electrode 20 may be direct current (DC), alternating current (AC) or a pulse voltage. The ammeter 26 is used to monitor the electrical current flowing between the rod and plate electrodes 20 and 24. This electrostatic field causes the liquid-liquid interface 56 to be violently disrupted as illustrated in FIG. 1. This disruption or turbulence causes peaked waves 58 to form in the aqueous phase 28 at the liquid-liquid interface 56. These peaked waves 58 have conical crest-like shapes. A small amount of metal containing aqueous solution is forced upward from each of these peaked waves 58 and is sheared into small drops 60 which are ejected into and dispersed in the organic phase 32 by the turbulence. The small size of these drops 60 increases extraction efficiency of the metal by the organic phase 32 through an increase in the ratio of surface area to internal volume of the drops 60. Also, the turbulence which causes the drops 60 to be formed also causes movement of the aqueous solution internally within the drops 60. This internal movement increases the diffusion rate for the metal within the drops 60 and ultimately increases extraction efficiency of the metal by the organic phase 32.

Because the drops 60 are negatively (or positively) charged, they travel upward against gravity within the organic phase 32 because of the Coulomb force between the drops 60 and the electrostatic field. While the drops 60 are dispersed in the organic phase 32, the metal contained within the aqueous solution of the drops 60 is extracted into the organic phase 32 by the extractant. The negatively (or positively) charged drops 60 continue to travel upward until they contact the positively (or negatively) charged gas/liquid interface 54. When the drops 60 contact the gas/liquid interface 54, the drops 60 are changed in polarity from a negative charge to a positive charge (or vice versa). The positively (or negatively) charged drops 60 then fall downward through the organic phase 32 toward the aqueous phase 28 by both gravitational force and the Coulomb force. Finally, the drops 60 coalesce instantly upon contact with the aqueous phase 28. The electrical current can be adjusted to promote coalescence of the drops 60.

The drops 60 move upward and downward through and cross-current to the organic phase 32 in a manner to indicate the electrostatic field is uniform. Although the mechanism by which a uniform field is established is not clear at present, it is known that the gas/liquid interface 54 acquires a positive (or negative) charge upon energization of the rod electrode 20. It is hypothesized that molecules of the nitrogen gas located in the gaseous phase 30 are attracted to the energized rod electrode 20 by dielectrophoretic action. Upon contact with the rod electrode 20, it is thought that the nitrogen molecules become positively (or negatively) charged and are subsequently repelled from the positively (or negatively) charged rod electrode 20. These positively (or negatively) charged nitrogen molecules would then pour onto the gas/liquid interface 54, thus, creating a charged layer of molecules at the gas/liquid interface 54. If this hypothesized mechanism is correct, the charged layer of molecules at the gas/liquid interface 54 would thus account for the uniform electric field which has been observed.

Figure 2:
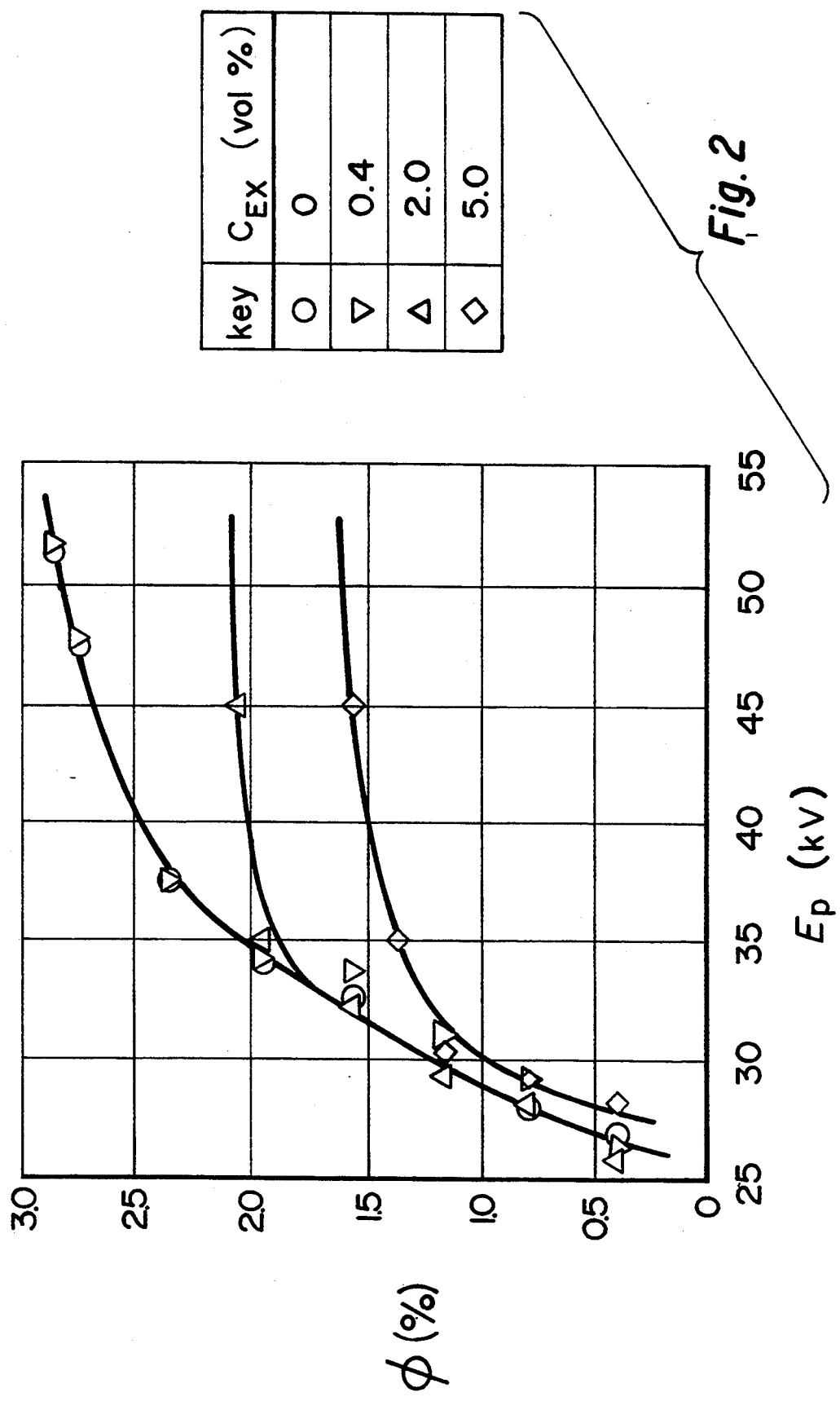
FIG. 2 shows the relationship between applied voltage, Ep, and holdup fraction, $\theta$, of the dispersed aqueous phase at various extractant concentrations, $C_{EX}$, in a system comprised of water, di-2-ethylhexyl phosphoric acid (D2EHP) and EXXON'S ISOPAR M.

A holdup fraction, 8, expressed in terms of percentage, %, is a measure of total volume contained within drops 60 suspended in the organic phase 32. Thus, the holdup fraction, $\theta$, is related to both drop size, and number of drops suspended. An example 1, shown in FIG. 2, illustrates that the holdup fraction, $\theta$, is a function of applied voltage, Ep, measured in kilovolts (kV), and is also affected by extractant concentration, $C_{EX}$, measured in volume percent, vol %, of extractant in the organic solvent. The data of FIG. 2 was obtained using a system comprised of ISOPAR M as the organic solvent and di-2-ethylhexyl phosphoric acid as the extractant with an aqueous phase of a depth of 15 millimeters, ram, an organic phase of a depth of 40 mm, and a nitrogen gaseous phase of a depth of 60 mm. The holdup fraction, $\theta$, increases with applied voltage, kV, in the case of low extractant concentration, $C_{EX}$, but their increasing ratio for applied voltage, kV, decreases with increasing extractant concentration, $C_{EX}$.

Figure 3:
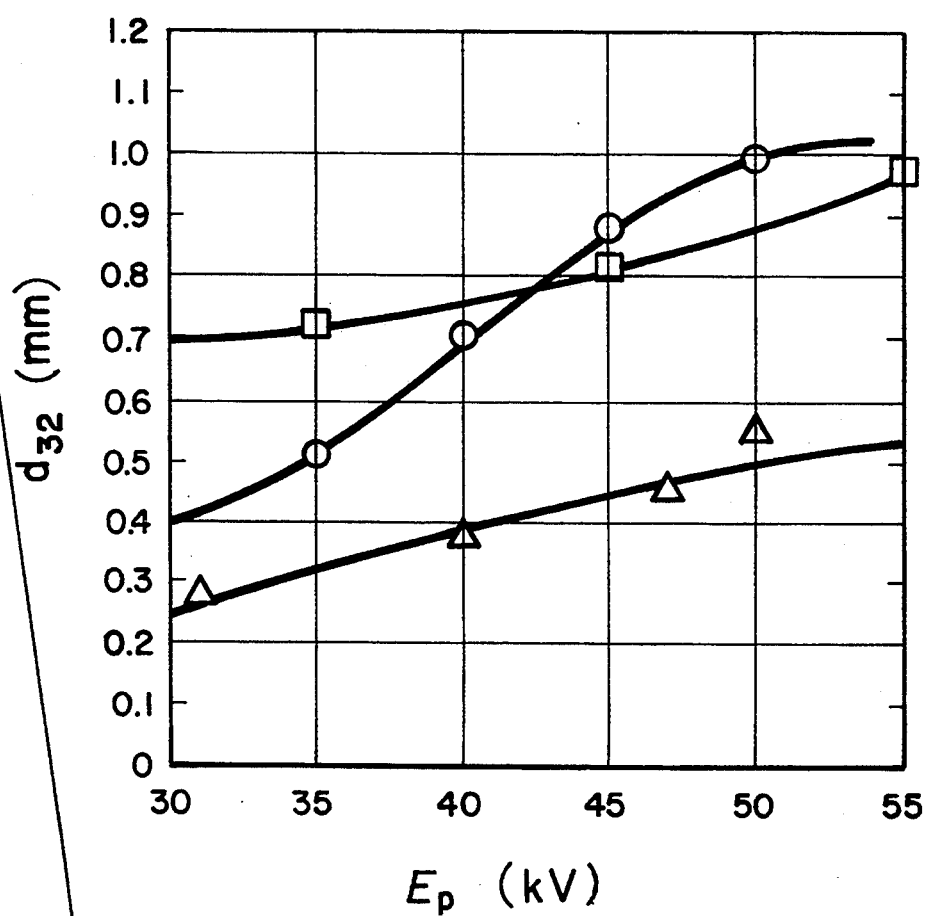
FIG. 3 shows the relationship between Sauter mean diameter, $D_{32}$, of dispersed drops and applied voltage, Ep, for various organic solvent systems.

An average of aggregate drop sizes is expressed in terms of Sauter mean diameter, $d_{32}$, measured in millimeters, mm. As illustrated in FIG. 3, the Sauter mean diameter, $d_{32}$, is a function of the applied voltage, Ep, measured in kilovolts, kV, for various systems of aqueous and organic phases 28 and 32. Differences in density, $\Delta \rho$, expressed in kilograms per cubic meter, $kg/m^3$, between the aqueous phase 28, expressed as "water" in the key to FIG. 3, and various organic phases 32 are included in the key to FIG. 3. Generally, Sauter mean diameter, $d_{32}$, decreases with increase in density difference, $\Delta \rho$, between the aqueous phase 28 and the organic phase 32.

Figure 4:
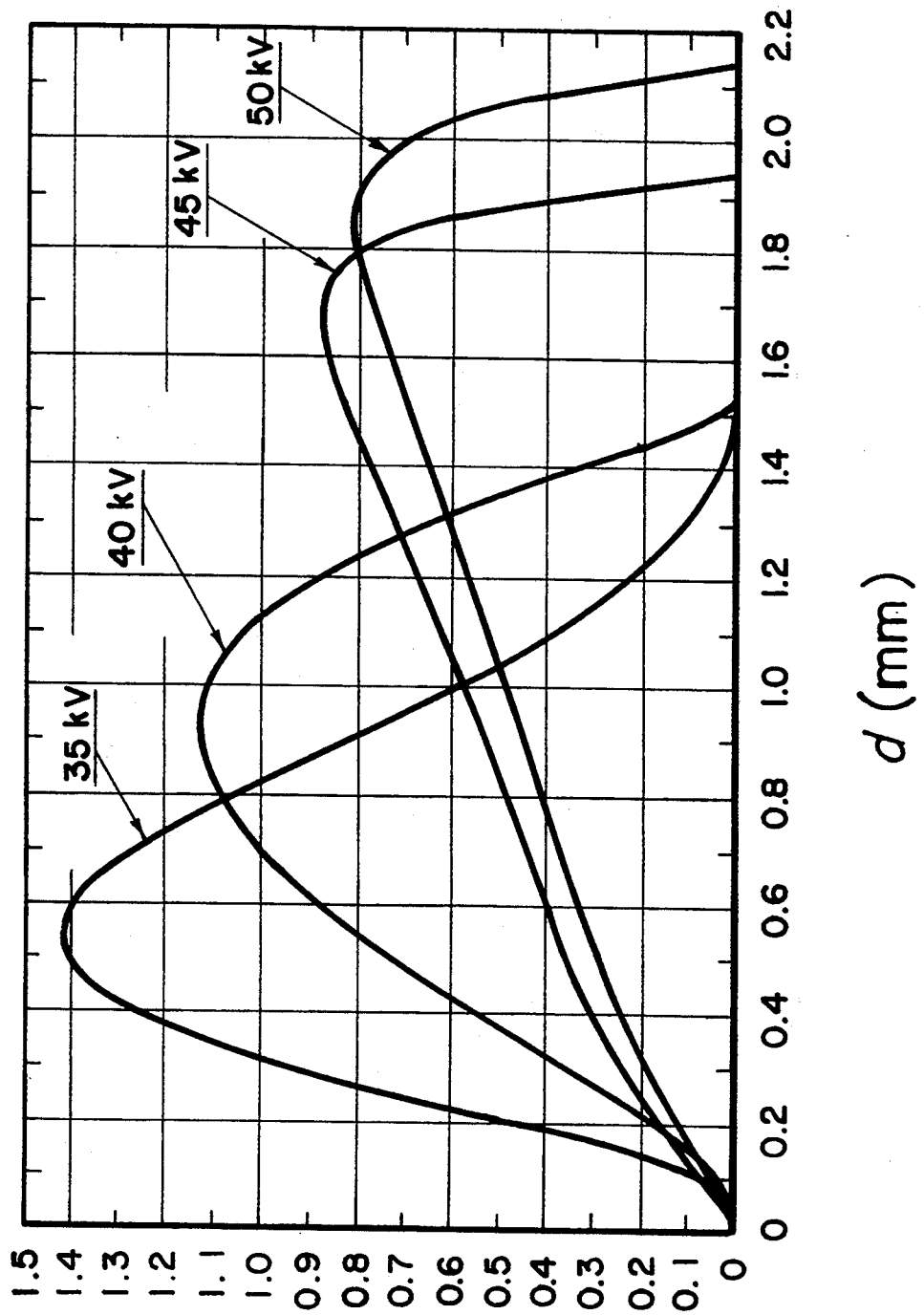
FIG. 4 illustrates the effect of various applied voltages, (35, 40, 45 and 50 kV), on drop size, d, and drop distribution, f(d), in a water and ISOPAR M system.

Drop size distribution, f(d), is a function of drop size, d, and is expressed in reciprocal millimeters, 1/mm. FIG. 4 illustrates the effect of different applied voltages (35 kV, 40 kV, 45 kV, and 50 kV) on drop size, d, measured in millimeters, mm, and drop size distribution, f(d). Each of the solid lines in FIG. 4 is a value calculated by the Mugele-Evans distribution function so as to fit the experimental data.

Figure 5:
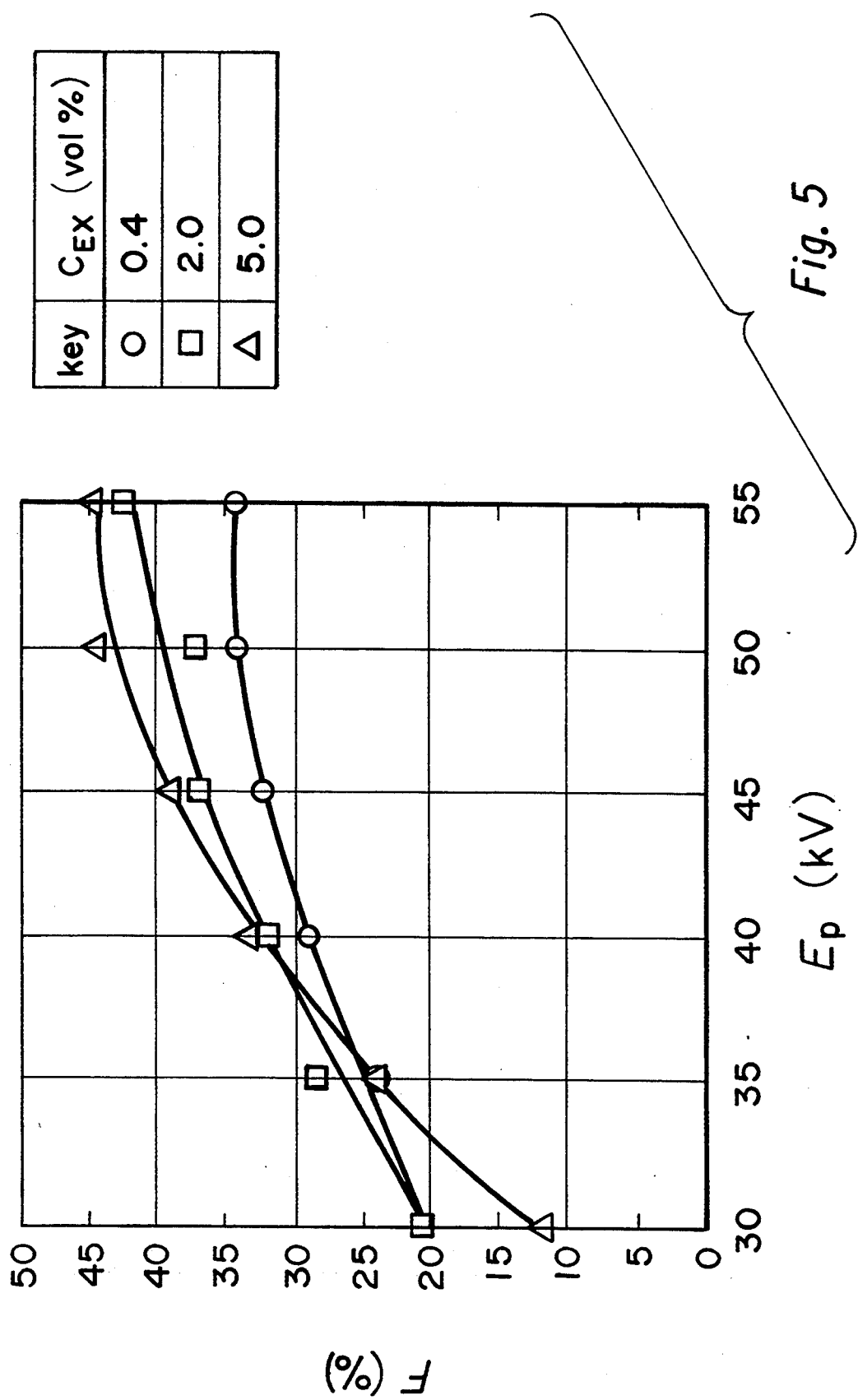
FIG. 5 shows the effect of applied voltage, Ep, on extraction efficiency, F, for various extractant concentrations, $C_{EX}$, in a system (example 1) comprised of an aqueous zinc sulphate solution ($ZnSO_4$), D2EHP, and ISOPAR M with a constant flow rate of 1 milliliter per second (ml/s) for both liquid phases and with feed concentration of 0.0005 moles per liter (mol/l) zinc at a pH of 4.1.

Extraction efficiency, F, is expressed in percentage, %, of metal extracted from the aqueous phase 28. FIG. 5 illustrates that extraction efficiency, F, is a function of applied voltage, Ep, for different extractant concentrations, $C_{EX}$, with extractant concentrations, $C_{EX}$, expressed in volume percent, vol %. The data in FIG. 5 was obtained in a system comprised of: (1) an aqueous phase 28 consisting of an aqueous solution containing zinc at a concentration of 0.0005 moles per liter, mol/l, at a pH of 4.1, and a flow rate of 1 milliliter per second, ml/s; (2) an organic phase 32 consisting of ISOPAR M and D2EPHA and at a flow rate of 1 millimeter per second, ml/s and; (3) a gaseous phase 30 consisting of nitrogen gas.

Figure 6:
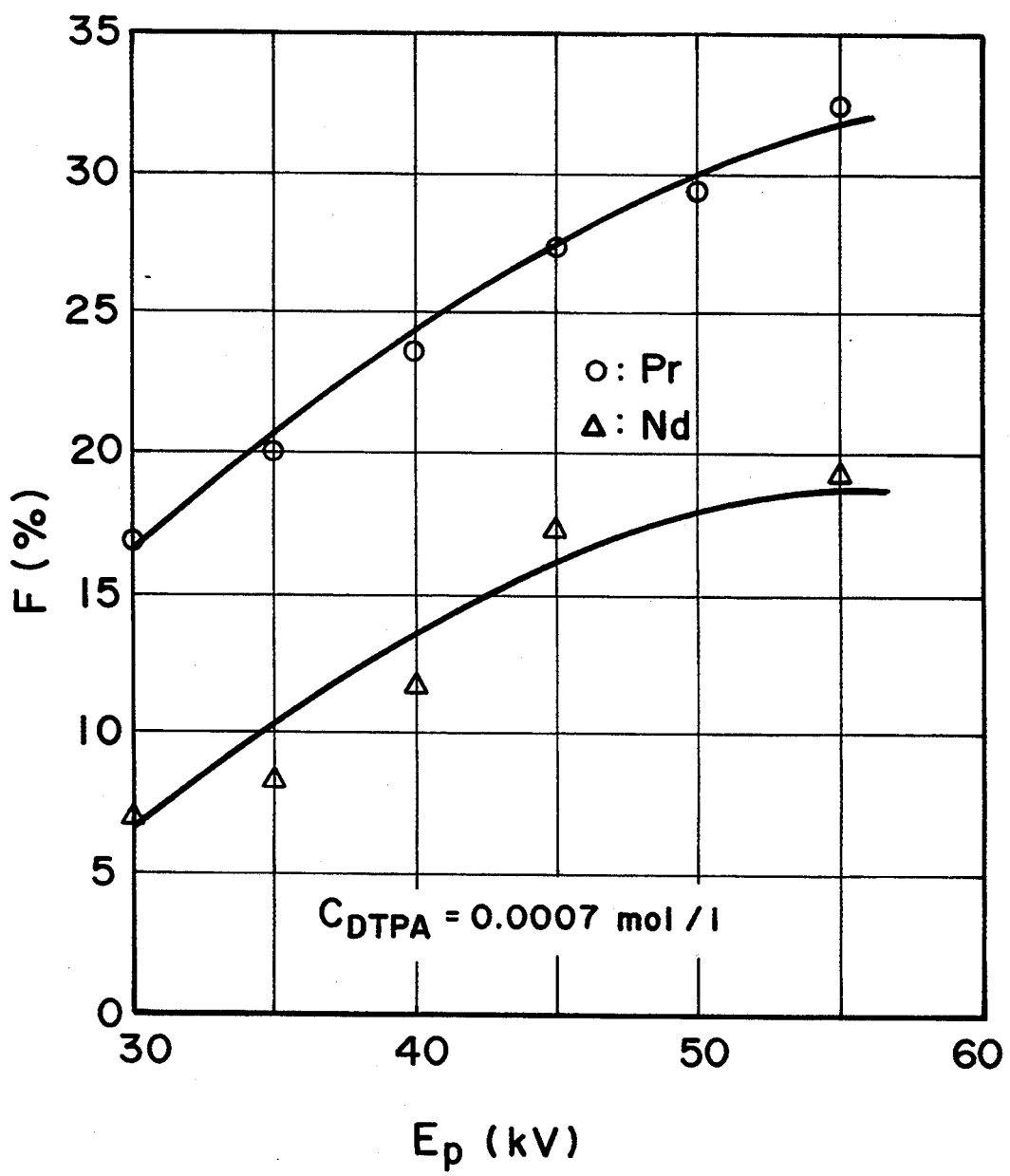
FIG. 6 shows a typical example, (example 2) of extraction and separation of rare-earth metals in the presence of complexing agent diethylene triamine pentaacetic acid, DTPA, comprised of an aqueous solution of praseodymium nitrate (0.0005 mol/l), neodymium nitrate (0.0005 mol/l) and DTPA (0.0007 mol/l), and organic solvent; ISOPAR M containing D2EHPA (0.01 mol/l), with constant flow rate of 1 milliliter per second (ml/s) for both liquid phases.

Application of the liquid-liquid contactor 10 to an industrial system (example 2) was studied on extraction and separation of rare-earth metals, Pr and Nd, in the presence of complexing agent, DTPA, by D2EHPA and the result is shown in FIG. 6. Extraction efficiency, F, is expressed in percentage, %, of metal extracted from the aqueous phase 28. FIG. 6 illustrates that extraction efficiency, F, is a function of applied voltage, Ep, with extractant concentration $C_{EX}$ 0.01 mol/l. The data in FIG. 6 was obtained in a system comprised of: (1) an aqueous phase 28 consisting of aqueous solution containing praseodymium (Pr) and neodymium (Nd) at a concentration of 0.0005 moles per liter, mol/l, respectively, DTPA at a concentration of 0.0007 moles per liter, mol/l, and a flow rate of 1 milliliter per second, ml/s; (2) an organic phase 32 consisting of ISOPAR M and D2EHPA at a concentration of 0.01 moles per liter, mol/l, and a flow rate of 1 milliliter per second, ml/s and; (3) a gaseous phase 30 of nitrogen gas.

The liquid-liquid system used in the experiment comprises: a dispersed aqueous phase 28 containing an aqueous solution of praseodymium nitrate, neodymium nitrate and diethylene triamine penta-acetic acid, DTPA, as a complexing agent, at concentrations of 0.0005 mol/l, 0.0005 mol/l, 0.0007 mol/l respectively and a continuous organic phase 32 ISOPAR M containing D2EHPA at a concentration of 0.01 mol/l.

2. Stripping Stage

Although not specifically illustrated, the stripping stage is similar to the extraction stage except for the composition of the two liquid phases 28 and 30 and except for the re-extraction of the metal into the aqueous phase 28 rather as in the extraction stage where than the metal is extracted from the aqueous phase 28 into the organic phase 32.

After the extraction stage is completed, the metal containing organic solvent/extractant mixture is removed from the chamber 18 via the organic phase outlet 42 and the organic phase outlet pump 44. The metal containing organic solvent/extractant mixture is then introduced as the organic phase 32 into a second liquid-liquid contactor (not illustrated). This second liquid-liquid contactor (not illustrated) is identical to the previously described liquid-liquid contactor 10. An aqueous solution containing exchange ions serves as the aqueous phase 28 and nitrogen gas serves as the gaseous phase 30 in the second contactor (not shown).

This second liquid-liquid contactor (not illustrated) is energized and the sequence of dispersion of the aqueous phase 28, i.e., mixing of both liquid phases 28 and 32 and separation of the liquid phases 28 and 32, occurs in a manner similar to that previously described for the first liquid-liquid contactor with the following exceptions: during this sequence the metal exchanges places with the exchange ions so that the exchange ions bind to the extractant in the organic phase 32, thus, regenerating the organic phase 32 for reuse in the extraction stage, and the metal is extracted into the aqueous phase 28. The metal containing aqueous phase 28 is then removed from the second liquid-liquid contactor (not illustrated) for further processing or use and the regenerated organic phase 32 is returned to the first contactor 10 for reuse.

Figure 7:
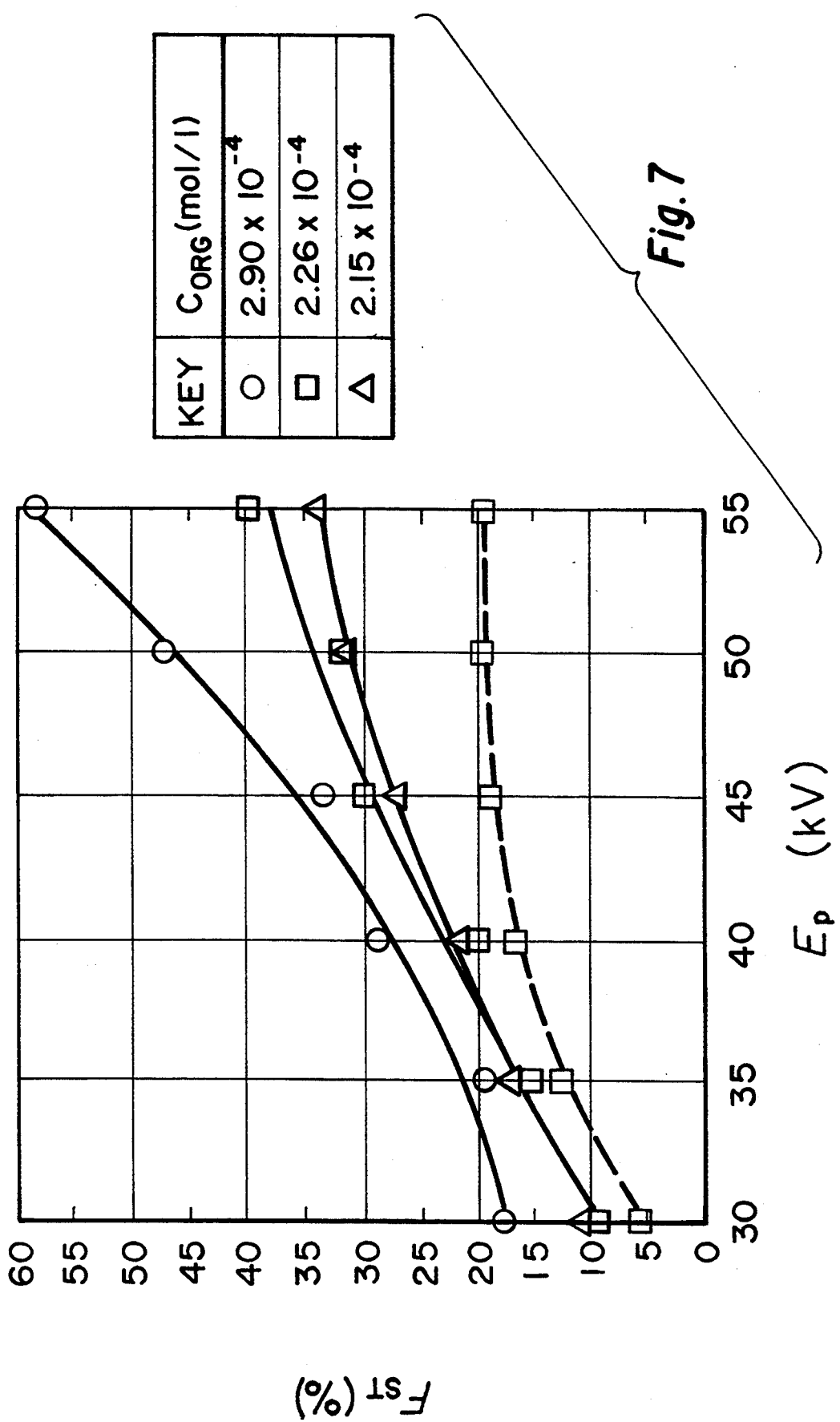
FIG. 7 shows the effect of applied voltage, Ep, on backward or reverse extraction efficiency, $F_{ST}$, at various extractant concentrations, $C_{ORG}$, for a system comprised of an aqueous sulfuric acid ($H_2SO_4$) solution, a zinc/di-2-ethylhexyl phosphoric acid complex, and ISOPAR M.

Efficiency of the stripping stage is expressed as backward or reverse extraction efficiency, $F_{ST}$. FIG. 7 shows that the backward extraction efficiency, $F_{ST}$, increases with increased applied voltage, kV, but increases less at higher concentrations of zinc/D2EHPA complex, $C_{ORG}$.

While the invention has been described for extraction of metals, the method is not limited to metals, but includes other components such as other elements or compounds. Also, although the invention has been described as employing exchange ions, the method includes other exchange components.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method for conducting liquid-liquid extraction comprising the following steps:
   (a) introduction into an interior chamber of a first electrostatic contactor an aqueous phase comprised of an aqueous solution containing a component to be extracted;
   (b) introducing an organic phase comprised of an extractant and organic solvent mixture into the chamber of the first electrostatic contactor which step may be accomplished before step (a) to form a liquid/liquid interface with said organic phase being above said aqueous phase;
   (c) introducing a gaseous phase comprised of a gas into the chamber of the first electrostatic contactor which step may be accomplished before either step (a) or step (b) to establish a liquid/gas interface with said gaseous phase being above said organic phase;
   (d) applying high voltage electrical current to a rod electrode located within the gaseous phase in order to create an electrical field within the chamber between the rod electrode and a plate electrode located within the aqueous phase adjacent the bottom of the tank;
   (e) maintaining the electrical field within the chamber of the electrostatic contactor a sufficient time for the component to be extracted into the organic phase; and
   (f) removing the organic phase which contains the extracted component from the first electrostatic contactor.

2. A method for conducting liquid-liquid extraction according to claim 1 wherein the gas comprising the gaseous phase in step (c) is nitrogen.

3. A method for conducting liquid-liquid extraction according to claim 1 further comprising the following steps:
   (g) introducing into an interior chamber of a second electrostatic contactor adjacent a bottom of the second electrostatic contactor a second aqueous phase comprised of an aqueous solution containing an exchange component to be exchanged with the extracted component;
   (h) introducing the organic phase of step (f) which contains the extracted component into the chamber of the second electrostatic contactor, which step may be accomplished before step (g) to form a liquid-liquid interface with said organic phase of step (f) being above said second aqueous phase;
   (i) introducing a gaseous phase comprised of a gas into the chamber of the second electrostatic contactor adjacent a top of the chamber and between the top of the chamber and the organic phase, which step may be accomplished before either step (g) or step (h) to establish a liquid/gas interface with said gaseous phase being above said organic phase;
   (j) applying high voltage electrical current to a rod electrode located within the gaseous phase in order to create an electrical field within the chamber of the second electrostatic contactor between the rod electrode and a plate electrode located within the aqueous phase adjacent the bottom;
   (k) maintaining the electrical field within the chamber of the second electrostatic contactor a sufficient time for the exchange component to move into the organic phase and the extracted component to move into the aqueous phase; and
   (l) removing the aqueous phase which contains the extracted component from the second electrostatic contactor for further processing or use.

4. A method for conducting liquid-liquid extraction according to claim 3 wherein the gas comprising the gaseous phase in step (i) is nitrogen.

* * * * *